United States Patent
Dakshinamurthy et al.

(10) Patent No.: US 10,074,009 B2
(45) Date of Patent: Sep. 11, 2018

(54) OBJECT POPULARITY DETECTION (71) Applicant: INTERNATIONAL BUSINESS MACHINES CORPORATION, Armonk, NY (US)

(72) Inventors: Karthikeyan Dakshinamurthy, Bangalore (IN); Vijay Ekambaram, Chennai (IN); Ashok Pon Kumar Sree Prakash, Bangalore (IN); Srikanth G. Tamilselvam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 14/579,205

(22) Filed: Dec. 22, 2014

(65) Prior Publication Data
US 2016/0180225 A1 Jun. 23, 2016

(51) Int. Cl.
*G06F 15/18* (2006.01)
*G06K 9/00* (2006.01)
*G06N 5/04* (2006.01)

(52) U.S. Cl.
CPC ..... *G06K 9/00302* (2013.01); *G06K 9/00335* (2013.01); *G06K 9/00979* (2013.01); *G06N 5/04* (2013.01)

(58) Field of Classification Search
USPC .............................. 706/15, 45, 12
See application file for complete search history.

(56) References Cited

U.S. PATENT DOCUMENTS

| | | | | |
|---|---|---|---|---|
| 7,757,171 B1 * | 7/2010 | Wong | ................ | G06F 17/30053 345/156 |
| 8,219,438 B1 | 7/2012 | Moon et al. | | |
| 8,489,119 B1 | 7/2013 | Fraccaroli | | |
| 8,577,876 B2 | 11/2013 | Kozko et al. | | |
| 2003/0128389 A1 * | 7/2003 | Matraszek | ........ | G06F 17/30265 358/1.18 |

(Continued)

FOREIGN PATENT DOCUMENTS

| | | |
|---|---|---|
| CN | 100424632 C | 10/2008 |
| CN | 102715887 A | 10/2012 |

(Continued)

OTHER PUBLICATIONS

U.S. Appl. No. 14/886,708, filed Oct. 19, 2015, Entitled "Object Popularity Detection".

(Continued)

*Primary Examiner* — David Robert Vincent
(74) *Attorney, Agent, or Firm* — Tihon Poltavets (57) ABSTRACT

A method for object popularity detection includes receiving expression data for a user viewing a first object. The expression data for the user viewing the first object includes a viewing duration, a variation in heart rate of the user, one or more facial expressions of the user, and a variation in eye movement of the user. The expression data for the user viewing the first object is aggregated into one or more models and a response is determined for sending to an electronic device associated with the user, based on the one or more models from which the expression data was aggregated. The response based on the one or more models from which the expression data was aggregated is transmitted to the electronic device associated with the user for viewing.

12 Claims, 3 Drawing Sheets

(56) References Cited

U.S. PATENT DOCUMENTS

| | | | |
|---|---|---|---|
| 2007/0003914 A1* | 1/2007 | Yang | G06F 9/4446 |
| | | | 434/236 |
| 2009/0006286 A1* | 1/2009 | Angell | G06K 9/00771 |
| | | | 706/12 |
| 2009/0271251 A1 | 10/2009 | Sorensen et al. | |
| 2009/0299814 A1 | 12/2009 | Grigsby et al. | |
| 2010/0123776 A1 | 5/2010 | Wydeven et al. | |
| 2012/0206603 A1* | 8/2012 | Rekimto | G06K 9/00308 |
| | | | 348/156 |
| 2013/0005443 A1* | 1/2013 | Kosta | G07F 17/3206 |
| | | | 463/25 |
| 2013/0325546 A1* | 12/2013 | Sorensen | G06Q 30/0201 |
| | | | 705/7.29 |
| 2015/0113058 A1* | 4/2015 | Zhang | H04L 65/403 |
| | | | 709/204 |
| 2015/0336276 A1* | 11/2015 | Song | B25J 11/001 |
| | | | 700/253 |

FOREIGN PATENT DOCUMENTS

| | | |
|---|---|---|
| CN | 102111822 B | 4/2014 |
| WO | 03019440 A1 | 3/2003 |
| WO | 2008048993 A2 | 4/2008 |
| WO | 2011024134 A1 | 3/2011 |
| WO | 2013173079 A1 | 11/2013 |

OTHER PUBLICATIONS

Appendix P.: List of IBM Patents or Patent Applications Treated As Related, Dated Oct. 20, 2015, 2 pages.

Picard, R. "Toward Agents that Recognize Emotion". M.I.T Media Laboratory Perceptual Computing Section Technical Report No. 515. Appeared Actes Proceedings IMAGINA, Mar. 1998, pp. 153-165. Monaco.

Popa, M. et al. "Products Appreciation by Facial Expressions Analysis". International Conference on Computer Systems and Technologies—CompSysTech'10, Jun. 17-18, 2010. Sofia, Bulgaria. pp. 293-298.

Scheirer, J. et al. "Expression Glasses: A wearable device for facial expression recognition". CHI 99 May 15-20, 1999. pp. 262-263.

Shergill, G. S. et al. "Computerized Sales Assistants: The Application of Computer Technology to Measure Consumer Interest—A Conceptual Framework". Journal of Electronic Commerce Research, vol. 9, No. 2, 2008. pp. 176-191.

\* cited by examiner

OBJECT POPULARITY DETECTION

BACKGROUND

The Internet of Things (IoT) is the interconnection of identifiable embedded computing devices with the existing Internet infrastructure. An object in the IoT can be controlled or can act as a controller without human interaction. The objective of the IoT is to transfer data over a network without requiring human-to-human or human-to-computer interaction. As a result, objects in the IoT can track and count data, while reducing waste, loss, and cost for sustaining authenticity of data. For example, suppose popularity of a vehicle (i.e., audience reaction) is to be determined on a showroom floor. Typically, a user's feedback is collected via a request from an entity collecting the data, and, as a result, the authenticity of the data can come into question. External factors can influence a person's feedback as the data is collected, for example, by using a questionnaire. The feedback may not be an accurate representation of the person's perception of the object, which in this example is the vehicle.

SUMMARY

Embodiments in accordance with the present invention disclose a method, computer program product and computer system for object popularity detection. A computer-implemented method includes receiving expression data for a user viewing a first object, wherein the expression data includes at least one or more of: a viewing duration, a variation in heart rate of the user, one or more facial expressions of the user, and a variation in eye movement of the user. The expression data is aggregated into one or more models. A response to send to an electronic device associated with the user is determined, based on the one or more models. The response is sent to the electronic device associated with the user.

DETAILED DESCRIPTION

Embodiments in accordance with the present invention allow for object popularity detection based on facial expression data associated with a user viewing a particular object. For example, a user with a wearable electronic device is walking through a technology convention, where the technology convention has multiple objects on display. The wearable electronic device includes facial expression recognition software capable of capturing the facial expressions of the user, as the user views a particular object on display at the technology convention. A cognitive program is capable of receiving facial expression data and determining an overall reaction toward the particular object by the user. Based on the determined overall reaction by the user, the cognitive program can determine a response to send to the wearable electronic device of the user. The cognitive program can also collect facial expression data for multiple users viewing the particular object and aggregate the facial expression data into a model, where the model represents the overall feedback for the particular object.

Figure 1:
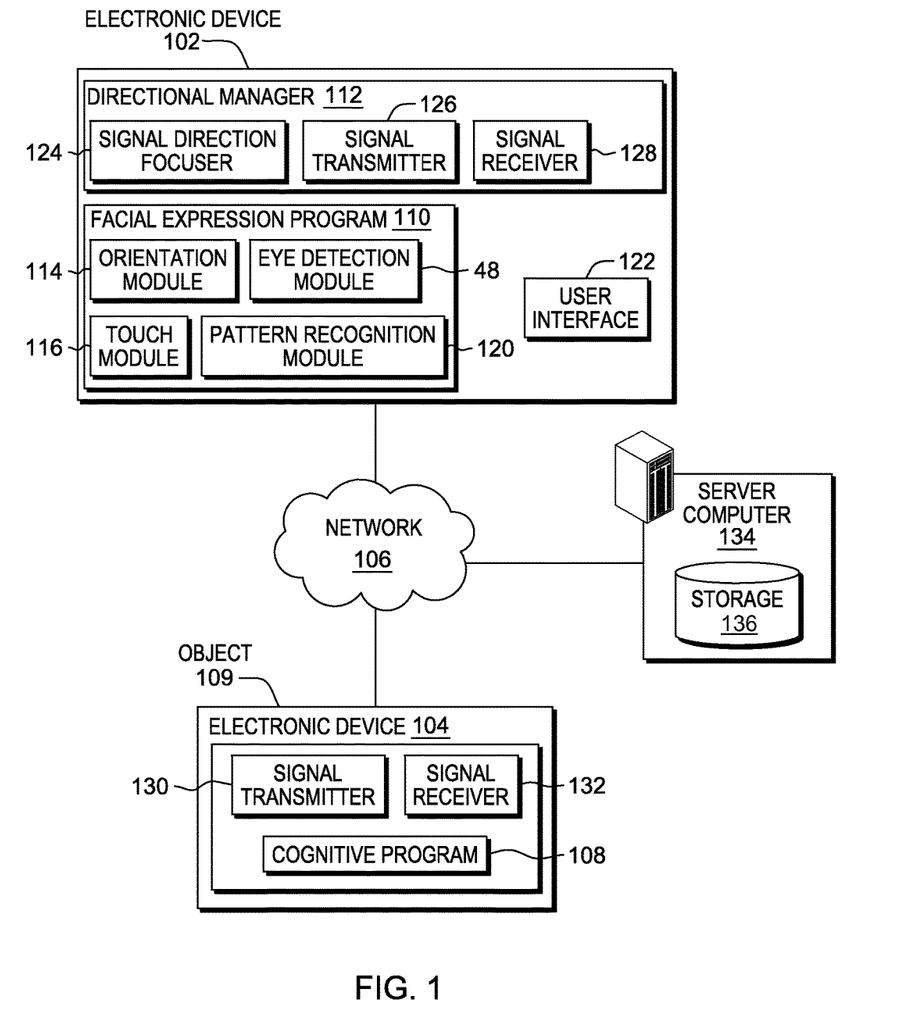
FIG. 1 is a functional block diagram illustrating a distributed data processing environment, in accordance with an embodiment of the present invention.

Example embodiments in accordance with the present invention will now be described in detail with reference to the drawing figures. FIG. 1 is a functional block diagram illustrating a distributed data processing environment in an embodiment in accordance with the present invention. The distributed data processing environment includes electronic device 102, electronic device 104 located on object 109, and server computer 134, interconnected over network 106.

Electronic device 102 may be an electronic package associated with an item wearable by a user, such as eyeglasses or a wristwatch. Electronic device 102 may also be a laptop computer, a tablet computer, a smart phone, or any programmable electronic device capable of communication with electronic device 104 and server computer 134 via network 106, and with various components and devices within the distributed data processing environment. Electronic device 102 has the ability to send and receive information, display information, and collect expression information from multiple programs and modules embedded within. In this embodiment, the user of electronic device 102 is viewing object 109, while the multiple programs and modules collect expression data of the user of electronic device 102. Electronic device 102 includes facial expression program 110, directional manager 112, and user interface 122.

Electronic device 104 may be a laptop computer, a tablet computer, a specialized computer server, a smart phone, or any programmable electronic device capable of communication with electronic device 102 and server computer 134 via network 106, and with various components and devices within the distributed data processing environment. Electronic device 104, located on object 109, is capable of receiving expression data from electronic device 102. Electronic device 104 includes cognitive program 108, signal transmitter 130, and signal receiver 132.

In this embodiment, cognitive program 108 is stored on electronic device 104 and can receive expression data for object 109, where the expression data is associated with a user viewing or touching object 109. Cognitive program 108 deciphers the received expression data and aggregates the received expression data into a model for object 109. The model can include information such as, a number of views, a number of particular responses, and viewing durations for object 109. For each user viewing object 109, cognitive program 108 can determine a response based on the facial expression data received for the user. In this embodiment, the response can include cognitive program 108 sending additional information to electronic device 102, or cognitive program 108 sending a question to electronic device 102 based on the expression data of the user.

In general, network 106 can be any combination of connections and protocols that can support communications between electronic device 102, electronic device 104, and server computer 134. Network 106 can include, for example, a local area network (LAN), a wide area network (WAN), such as the internet, a cellular network, or any combination of the preceding, and can further include wired, wireless, and/or fiber optic connections.

Facial expression program 110 includes orientation module 114, touch module 116, eye detection module 118, and pattern recognition module 120, and various other components and modules not illustrated. Facial expression program 110 has the ability to collect expression data from the various modules (e.g., orientation module 114) embedded within. Orientation module 114 has the ability to determine X, Y, and Z coordinates for the user of electronic device 102, wherein the X, Y, and Z coordinates translate into a particular view direction. For example, facial expression module program 110 can determine the user of electronic device 102 is looking 0 degrees North and −10 degrees in the latitude direction, which translates to the user of electronic device 102 looking straight ahead and slightly downwards. Orientation module 114 can also include a Global Positioning System (GPS) sensor to determine an overall position of the user of electronic device 102.

Touch module 116 can include a heart rate sensor, capable of capturing changes in the heart rate of the user of electronic device 102. Variations in heart rates as recorded by touch module 116, and viewing orientation as provided by orientation module 114, allow for facial expression program 110 to determine if an object being viewed is affecting the heart rate of the user of electronic device 102. In one example, the heart rate of the user of electronic device 102 increases when viewing object 109, and, as a result, facial expression program 110 determines the person is possibly excited about viewing object 109. In another example, the heart rate of the user of electronic device 102 is unchanged when viewing object 109, and, as a result, facial expression program 110 determines the person is not excited about viewing object 109.

Eye detection module 48 can monitor changes in the eyes of the user of electronic device 102. Variations in eye movements (e.g., pupil dilation) as recorded by eye detection module 48, and viewing orientation as provided by orientation module 114, allow for facial expression program 110 to determine if the object being viewed is affecting the user of electronic device 102. In one example, eye detection module 118 determines the eyes of the user of electronic device 102 widen as object 109 is being viewed. As a result, facial expression program 110 determines the user of electronic device 102 is looking at object 109 in finer detail. In another example, eye detection module 118 determines the eyes of the user of electronic device 102 appear partially closed as object 109 is being viewed. As a result, facial expression program 110 determines the user of electronic device 102 is not looking at object 109 in finer detail.

Pattern recognition module 120 can monitor changes in the face of the user of electronic device 102. Variations in facial expressions as recorded by pattern recognition module 120, and viewing orientation as provided by orientation module 114, allow for facial expression program 110 to determine a type of reaction toward a particular object (i.e., object 109) based on the location of the user of electronic device 102. Facial expressions can include six emotion categories: happiness, sadness, surprise, anger, disgust, and fear. Each of the facial expressions can further include additional measures, such as a broad smile representing a high level of happiness, and a faint smile representing a lower level of happiness. Facial expression program 110 can gather facial expression data from pattern recognition module 120, along with other data from orientation module 114, touch module 116, and eye detection module 48, and send it to electronic device 104 host cognitive program 108.

User interface (UI) 122 provides an interface between a user of electronic device 102 and cognitive program 108. User interface (UI) 122 can also provide an interface between the user of electronic device 102, facial expression program 110, and directional program 112. User interface 122 may be a graphical user interface (GUI) or a web user interface (WUI) and can display text, documents, web browser windows, user options, application interfaces, and instructions for operation, and includes the information (such as graphic, text, and sound) a program presents to a user, and the control sequences the user employs to control the program. User interface 122 may also be mobile application software that provides an interface between a user of electronic device 102 and cognitive program 108. Mobile application software, or an "app", is a computer program designed to run on smart phones, tablet computers, and other mobile devices. The user of electronic device 102 can utilize user interface 122 to manually activate facial expression program 110 to capture facial expression data.

Directional manager 112 includes signal direction focuser 124, signal transmitter 126, and signal receiver 128. In this embodiment, directional manager 112 receives expression data from facial expression program 110 and sends the expression data to electronic device 104. Signal direction focuser 124 allows for directional manager 112 to direct an information-carrying signal towards object 109, where electronic device 104 on object 109 can receive the information-carrying signal. Signal direction focuser 124 can work in conjunction with orientation module 114 to determine a direction toward which the signal is to be directed, based on the viewing direction of the user of electronic device 102. Signal transmitter 126 and signal receiver 128 allow for directional manager 112 to send and receive signals, where the signal types include Infrared, Bluetooth, and RFID. In this embodiment, signal transmitter 126 sends expression data to signal receiver 132 located on electronic device 104 and signal transmitter 130 sends a response from cognitive program 108 to signal receiver 128.

Server computer 134 represents a computer system utilizing clustered computers and components that act as a single pool of seamless resources when accessed through server network 106, as is common in data centers and with cloud computing applications. In general, server computer 134 is representative of any programmable electronic device or combination of programmable electronic devices capable of executing machine-readable program instructions and communicating with other computer devices via a network.

Storage 136 located on server computer 134 can store various information including data from cognitive program 108, expression data from electronic device 102, and information about object 109.

Figure 2:
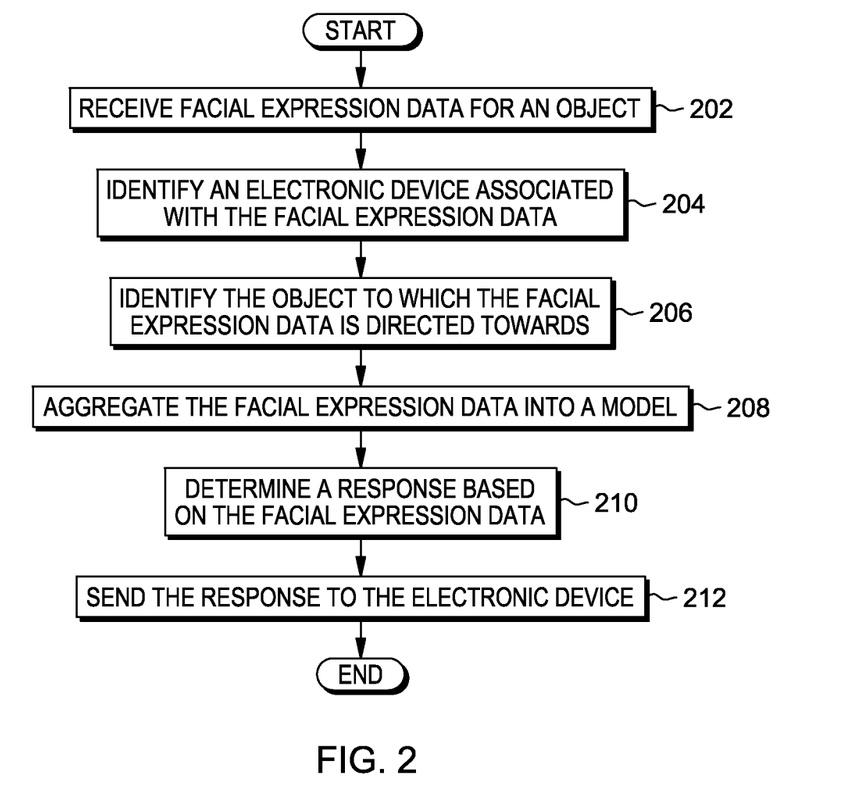
FIG. 2 is a flowchart depicting operational steps of a cognitive program for managing expression data for objects, in accordance with an embodiment of the present invention.

FIG. 2 is a flowchart depicting operational steps of a cognitive program for managing expression data for objects, in accordance with an embodiment of the present invention.

Cognitive program 108 receives facial expression data for an object (step 202). In this embodiment, a user of electronic device 102 is viewing object 109 and cognitive program 108 receives facial expression data from electronic device 102 for object 109. The facial expression data that cognitive program 108 receives can include various data points. Data points can include a duration for how long the user of electronic device 102 views object 109, a variation in heart rate of the user of electronic device 102, one or more facial expressions of the user of electronic device 102, and a variation in eye movements of the user of electronic device 102, while viewing object 109. In this embodiment, electronic device 102 is an electronic package associated with eyeglasses wearable by a user that is capable of capturing the facial expression data. In another embodiment, electronic device 102 is an electronic package associated with a watch capable of capturing facial expression data, wherein the electronic package associated with the watch can send the facial expression data directly to electronic device 104, or through an additional device, such as a smartphone.

Cognitive program 108 identifies an electronic device associated with the facial expression data (step 204). In this embodiment, cognitive program 108 identifies the electronic device (i.e., electronic device 102) associated with the facial expression data based on identification metadata received with the facial expression data. The identification metadata includes an identification number associated with electronic device 102, where cognitive program 108 can utilize the identification metadata to send information to electronic device 104. In another embodiment, cognitive program 108 identifies the electronic device (i.e., electronic device 102) associated with the facial expression data based on social network identification metadata associated with the facial expression data. The social network identification metadata can include a username and a method of contact, for example, an email address for the user of electronic device 102.

Cognitive program 108 identifies the object to which the facial expression data is directed (step 206). In this embodiment, cognitive program 108 is located on electric device 104, on object 109, where object 109 is a single steering wheel of a vehicle. An administrative user of cognitive program 108 can pre-program information about object 109, such as vehicle manufacturer, vehicle model name, and a date of manufacture. In another embodiment, cognitive program 108 is located on server computer 134 and manages two or more objects with an electronic device associated with each of the two or more objects. Cognitive program 108 can determine which electronic device associated with one of the two or more objects receives the facial expression data, and, based on the electronic device receiving the facial expression data, cognitive program 108 can determine which object the facial expression data is associated with.

Cognitive program 108 aggregates the facial expression data into a model (step 208). In this embodiment, cognitive program 108 aggregates the facial expression data into a popularity index model. As previously mentioned, facial expression data can include a duration for how long the user of electronic device 102 views object 109, a variation in heart rate of the user of electronic device 102, one or more facial expressions of the user of electronic device 102, and a variation in eye movements of the user of electronic device 102, while viewing object 109.

For a duration of how long the user of electronic device 102 views object 109, cognitive program 108 can input the duration into a model with received durations from other users viewing object 109. Cognitive program 108 can compare the duration for the user of electronic device 102 to determine if the duration exceeds an average value for the received durations from other users viewing object 109. For example, if the average value for the received durations from other users viewing object 109 is 45 seconds, and the duration received for the user of electronic device 102 is 90 seconds, cognitive program 108 determines the user of electronic device 102 has more interest in object 109 than the average user viewing object 109.

For a variation in heart rate of the user of electronic device 102 viewing object 109, cognitive program 108 can input the variations in heart rate into a model with received variations from other users viewing object 109. Cognitive program 108 can compare variation in heart rate for the user of electronic device 102 to determine if the variation in heart rate exceeds an average value for the received variations in heart rates from other users viewing object 109. For example, if the average value for the received variations in heart rate is plus 10 beats and the variation in heart rate for the user of electronic device 102 is minus 7 beats, cognitive program 108 determines the user of electronic device 102 is less excited in viewing object 109 than the average user viewing object 109.

For a type of facial expression of the user of electronic device 102 viewing object 109, cognitive program 108 can input the type of facial expression into a model with received types of facial expressions for each of the other users viewing object 109. Cognitive program 108 can track an amount for each type of facial expression received in the facial expression data and determine an overall user expression toward object 109 based on the type of facial expression with the greatest amount of counts.

Cognitive program 108 determines a response based on the facial expression data (step 210). In this embodiment, cognitive program 108 can determine three type of responses, where the three types of responses are based on positive, negative, and neutral facial expression data. Neutral facial expression data for the user of electronic device 102, with respect to facial expression data of other users viewing object 109, signals that the user of electronic device 102 views object 109 in a neutral manner. As a result, cognitive program 108 determines to create a response thanking the user of electronic device 102 for viewing object 109.

Positive facial expression data for the user of electronic device 102, with respect to facial expression data of other users viewing object 109, signals that the user of electronic device 102 views object 109 in a positive manner. As a result, cognitive program 108 determines to create a response with additional information on object 109. For example, if object 109 is a steering wheel in a vehicle, cognitive program 108 can query local or remote storages (i.e., storage 136) to gather additional information on the steering wheel. The additional information can include the materials used for the steering wheel, the dimensions of the steering wheel, the color used for the steering wheel, or any designer comments about the steering wheel.

Negative facial expression data for the user of electronic device 102, with respect to facial expression data of other users viewing object 109, signals that the user of electronic device 102 views object 109 in a negative manner. As a result, cognitive program 108 determines to create a response with feedback questions to address the negative reaction toward object 109. For example, if object 109 is a steering wheel in a vehicle, cognitive program 108 can create a response with feedback questions such as, "What did you not like about the steering wheel?" and "How would you change the steering wheel?". Cognitive program 108 also has the ability to determine if the duration the user of electronic device 102 viewed object 109 warrants a response with feedback questions. Cognitive program 108 can utilize a threshold duration, pre-determined by an administrative user, as to which user with a negative reaction warrants a response with feedback questions. For example, if a threshold duration is 30 seconds and the user of electronic device 102 views object 109 for a duration of 5 seconds, cognitive program 108 determines to not include a response with feedback questions. Instead, cognitive program 108 can send a response with a message thanking the user of electronic device 102 for viewing object 109. However, if the user of electronic device 102 views object 109 for a duration of 60 seconds, cognitive program 108 determines to include a response with feedback questions.

Cognitive program 108 sends the response to the electronic device (step 212). In this embodiment, cognitive program 108 sends the response to the electronic device (i.e., electronic device 102) identified in step 204. Cognitive program 108 can utilize the signal transmitter 130 to send the response to electronic device 102, where electronic device 102 can display the response to the user in user interface 122.

Figure 3:
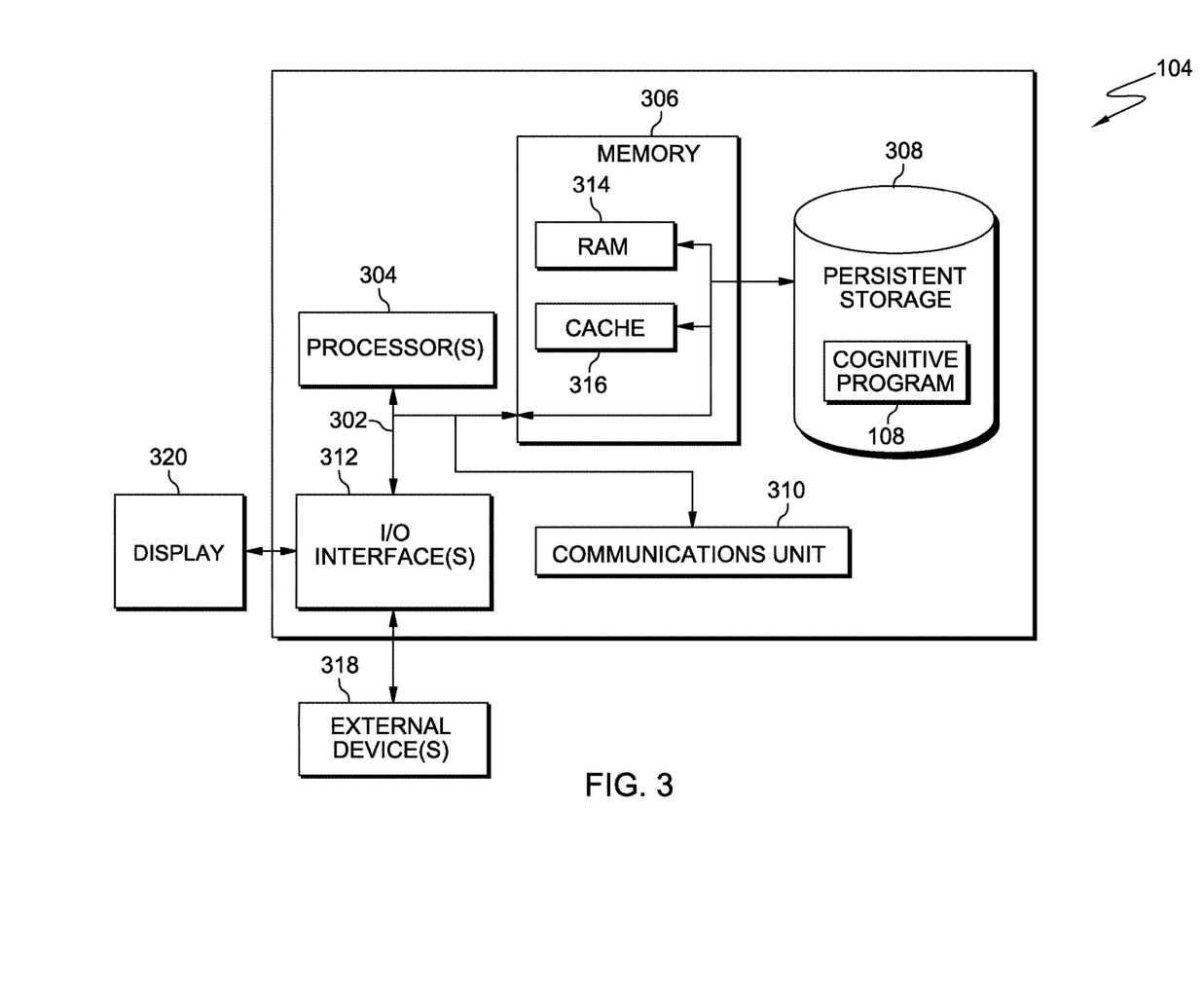
FIG. 3 is a block diagram of components of a computer system, such as the computer server of FIG. 1, in accordance with an embodiment of the present invention.

FIG. 3 depicts a block diagram of components of a computer, such as electronic device 104, hosting cognitive program 108 in an illustrative embodiment in accordance with the present invention. It should be appreciated that FIG. 3 provides only an illustration of one implementation and does not imply any limitations with regard to the environments in which different embodiments may be implemented. Many modifications to the depicted environment may be made.

Electronic device 104 include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are examples of computer readable tangible storage devices. A storage device is any piece of hardware that is capable of storing information, such as, data, program code in functional form, and/or other suitable information on a temporary basis and/or permanent basis. In this embodiment, memory 306 includes random access memory (RAM) 314 and cache memory 316. In general, memory 306 can include any suitable volatile or non-volatile computer readable storage device.

Cognitive program 108 is stored in persistent storage 308 for execution by one or more of computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including systems and devices within or controlled by electronic device 104. In these examples, communications unit 310 includes one or more wireless network interface cards. Communications unit 310 may provide communications through the use of either or both physical and wireless communications links. Computer programs and processes, such as cognitive program 108, may be downloaded to persistent storage 308 through communications unit 310, or uploaded to another system through communications unit 310.

I/O interface(s) 312 allows for input and output of data with other devices that may be connected to electronic device 104. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 may also connect to a display 320. Display 320 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for object popularity detection, the computer program product comprising:
   one or more computer readable tangible storage media and program instructions stored on at least one of the one or more storage media, wherein the computer readable tangible storage media is not a transitory signal per se, the program instructions comprising:
   program instructions to determine a particular viewing direction of a user, wherein a first object is located in the particular viewing direction;
   program instructions to receive expression data for the user viewing the first object, wherein the expression data includes: a viewing duration, a variation in heart rate of the user, one or more facial expressions of the user, and a variation in eye movement of the user;
   program instructions to aggregate the expression data into one or more models;
   program instructions to, responsive to determining the one or more models for the aggregated expression data includes positive reaction data, determine a response to send to a first electronic device associated with the user, based on the one or more models;
   program instructions to query a storage device for additional information for the first object based on the positive reaction data, wherein the additional information includes specification information pertaining to the first object; and
   program instructions to, responsive to receiving the additional information on the first object from the storage device, send the response to the first electronic device associated with the user, wherein the response includes the received additional information for the first object.

2. The computer program product of claim 1, wherein sending the response to the electronic device associated with the user comprises program instructions, stored on the one or more computer readable storage media, which when executed by a processor, cause the processor to:
   send the response in the form of an infrared signal to the first electronic device associated with the user.

3. The computer program product of claim 1, further comprising program instructions, stored on the one or more computer readable storage media, which when executed by a processor, cause the processor to:
   send the response to a second electronic device, wherein the second electronic device is associated with the first object; and
   instruct the second electronic device to display the response.

4. The computer program product of claim 1, further comprising program instructions, stored on the one or more computer readable storage media, which when executed by a processor, cause the processor to:
  identify the first object for which the expression data is received; and
  receive metadata, wherein the metadata includes an identification number for the first electronic device.

5. The computer program product of claim 1, further comprising program instructions, stored on the one or more computer readable storage media, which when executed by a processor, cause the processor to:
  identify the first object for which the expression data is received; and
  receive social network identification metadata, wherein the social network identification metadata includes at least a username and a method of contact.

6. The computer program product of claim 1, wherein determining a response to send to a first electronic device associated with the user, based on the one or more models, comprises program instructions, stored on the one or more computer readable storage media, which when executed by a processor, cause the processor to:
  determine the received expression data includes negative facial expression data;
  determine the response to send to the first electronic device based on the negative facial expression data, wherein the response includes one or more feedback questions.

7. A computer system for content management across multiple server computers, the computer system comprising:
  one or more computer processors;
  one or more computer readable storage media; and
  program instructions stored on the computer readable storage media for execution by at least one of the one or more computer processors, the program instructions comprising:
  program instructions to determine a particular viewing direction of a user, wherein a first object is located in the particular viewing direction;
  program instructions to receive expression data for the user viewing the first object, wherein the expression data includes: a viewing duration, a variation in heart rate of the user, one or more facial expressions of the user, and a variation in eye movement of the user;
  program instructions to aggregate the expression data into one or more models;
  program instructions to, responsive to determining the one or more models for the aggregated expression data includes positive reaction data, determine a response to send to a first electronic device associated with the user, based on the one or more models;
  program instructions to query a storage device for additional information for the first object based on the positive reaction data, wherein the additional information includes specification information pertaining to the first object; and
  program instructions to, responsive to receiving the additional information on the first object from the storage device, send the response to the first electronic device associated with the user, wherein the response includes the received additional information for the first object.

8. The computer system of claim 7, wherein sending the response to the electronic device associated with the user comprises program instructions, stored on the one or more computer readable storage media, which when executed by a processor, cause the processor to:
  send the response in the form of an infrared signal to the first electronic device associated with the user.

9. The computer system of claim 7, further comprising program instructions, stored on the one or more computer readable storage media, which when executed by a processor, cause the processor to:
  send the response to a second electronic device, wherein the second electronic device is associated with the first object; and
  instruct the second electronic device to display the response.

10. The computer system of claim 7, further comprising program instructions, stored on the one or more computer readable storage media, which when executed by a processor, cause the processor to:
  identify the first object for which the expression data is received; and
  receive metadata, wherein the metadata includes an identification number for the first electronic device.

11. The computer system of claim 7, further comprising program instructions, stored on the one or more computer readable storage media, which when executed by a processor, cause the processor to:
  identify the first object for which the expression data is received; and
  receive social network identification metadata, wherein the social network identification metadata includes at least a username and a method of contact.

12. The computer system of claim 7, wherein determining a response to send to a first electronic device associated with the user, based on the one or more models, comprises program instructions, stored on the one or more computer readable storage media, which when executed by a processor, cause the processor to:
  determine the received expression data includes negative facial expression data;
  determine the response to send to the first electronic device based on the negative facial expression data, wherein the response includes one or more feedback questions.

* * * * *